United States Patent
Nanba et al.

(10) Patent No.: US 8,540,428 B2
(45) Date of Patent: Sep. 24, 2013

(54) EASILY TEARABLE FASTENER TAPE, METHOD OF PRODUCING THE FASTENER TAPE, PACKAGING BAG WITH EASILY TEARABLE FASTENER TAPE, AND DEVICE AND METHOD FOR PRODUCING THE PACKAGING BAG

(75) Inventors: Yoshinori Nanba, Sodegaura (JP); Kenichi Tanaka, Sodegaura (JP); Shuichi Goto, Chuo-ku (JP)

(73) Assignee: Idemitsu Unitech Co., Ltd., Tokyo (JP)

( * ) Notice: Subject to any disclaimer, the term of this patent is extended or adjusted under 35 U.S.C. 154(b) by 649 days.

(21) Appl. No.: 12/442,204

(22) PCT Filed: Jun. 27, 2007

(86) PCT No.: PCT/JP2007/062922
§ 371 (c)(1),
(2), (4) Date: Mar. 20, 2009

(87) PCT Pub. No.: WO2008/035494
PCT Pub. Date: Mar. 27, 2008

(65) Prior Publication Data
US 2010/0074562 A1    Mar. 25, 2010

(30) Foreign Application Priority Data

Sep. 22, 2006  (JP) ................. 2006-257556
Jan. 10, 2007  (JP) ................. 2007-002886

(51) Int. Cl.
*B65D 65/28*    (2006.01)

(52) U.S. Cl.
USPC ........... 383/207; 383/61.2; 383/200; 383/203

(58) Field of Classification Search
USPC ................. 383/61.2, 200–204, 207, 209
See application file for complete search history.

(56) References Cited

U.S. PATENT DOCUMENTS 3,780,781 A * 12/1973 Uramoto ............... 383/204
4,363,345 A * 12/1982 Scheibner ............. 383/63
(Continued)

FOREIGN PATENT DOCUMENTS

JP    63-62349 U    4/1988
JP    08-268442 A   10/1996
(Continued)

OTHER PUBLICATIONS

International Search Report for PCT/JP2007/062922 (Jul. 20, 2007).

*Primary Examiner* — Hemant M Desai
*Assistant Examiner* — Gloria R Weeks
(74) *Attorney, Agent, or Firm* — Millen, White, Zelano & Branigan, P.C.

(57) ABSTRACT

A belt-shaped base of a male member of a zipper tape attached to an inner surface of a bag body includes: a main body on which an engagement portion is provided; a first projecting portion provided on an opening-side of the main body; a thin portion connected to an opening-side of the first projecting portion; and a second projecting portion connected to an opening-side of the thin portion. A belt-shaped base of a female member includes: a main body; a first projecting portion; a thin portion; and a second projecting portion. When the zipper tape is fused onto the bag body, a space is provided between the thin portions and a film of the bag body.

20 Claims, 11 Drawing Sheets

(56) References Cited

U.S. PATENT DOCUMENTS

| | | | |
|---|---|---|---|
| 4,430,070 A * | 2/1984 | Ausnit | 493/215 |
| 5,067,822 A * | 11/1991 | Wirth et al. | 383/61.2 |
| 5,092,684 A * | 3/1992 | Weeks | 383/61.2 |
| 5,238,306 A * | 8/1993 | Heintz et al. | 383/210.1 |
| 5,356,222 A * | 10/1994 | Kettner et al. | 383/63 |
| 5,366,294 A * | 11/1994 | Wirth et al. | 383/210.1 |
| 5,486,051 A * | 1/1996 | May | 383/200 |
| 5,489,252 A * | 2/1996 | May | 383/210.1 |
| 5,492,411 A * | 2/1996 | May | 383/5 |
| 5,525,363 A * | 6/1996 | Herber et al. | 426/130 |
| 5,552,202 A * | 9/1996 | May | 428/43 |
| 5,609,420 A * | 3/1997 | Palmisano | 383/203 |
| 5,618,111 A * | 4/1997 | Porchia et al. | 383/63 |
| 5,628,566 A * | 5/1997 | Schreiter | 383/63 |
| 5,660,479 A * | 8/1997 | May et al. | 383/204 |
| 5,664,303 A * | 9/1997 | Johnson | 24/585.12 |
| 5,718,024 A * | 2/1998 | Robbins | 24/30.5 R |
| 5,749,658 A * | 5/1998 | Kettner | 383/204 |
| 5,783,012 A * | 7/1998 | Porchia et al. | 156/66 |
| 5,817,380 A * | 10/1998 | Tanaka | 428/35.7 |
| 5,827,163 A * | 10/1998 | Kettner | 493/211 |
| 5,832,145 A * | 11/1998 | Dais et al. | 383/211 |
| 5,904,425 A * | 5/1999 | May | 383/203 |
| 6,004,032 A * | 12/1999 | Kapperman et al. | 383/5 |
| 6,030,122 A * | 2/2000 | Ramsey et al. | 383/61.2 |
| 6,131,370 A * | 10/2000 | Ausnit | 53/412 |
| 6,154,934 A * | 12/2000 | Matthews | 24/585.1 |
| 6,210,038 B1 * | 4/2001 | Tomic | 383/210 |
| 6,217,216 B1 * | 4/2001 | Taheri | 383/207 |
| 6,318,894 B1 * | 11/2001 | Derenthal | 383/204 |
| 6,345,911 B1 * | 2/2002 | Young et al. | 383/6 |
| 6,350,057 B1 * | 2/2002 | Forman | 383/61.2 |
| 6,354,738 B1 * | 3/2002 | Buckman et al. | 383/5 |
| 6,481,890 B1 * | 11/2002 | VandenHeuvel | 383/64 |
| 6,553,740 B2 * | 4/2003 | Delisle | 53/133.4 |
| 6,659,643 B2 * | 12/2003 | Plourde et al. | 383/61.2 |
| 6,691,491 B2 * | 2/2004 | Terminella et al. | 53/133.4 |
| 6,871,473 B1 * | 3/2005 | Dutt et al. | 53/133.4 |
| 6,895,725 B2 * | 5/2005 | Cortigiano, Sr. | 53/133.4 |
| 6,976,787 B2 * | 12/2005 | Plourde | 383/64 |
| 7,036,987 B2 * | 5/2006 | Crunkleton et al. | 383/64 |
| 7,192,192 B2 * | 3/2007 | VandenHeuvel et al. | 383/65 |
| 7,216,405 B2 * | 5/2007 | Gradl | 24/585.12 |
| 7,290,660 B2 * | 11/2007 | Tilman et al. | 206/524.8 |
| 7,364,361 B2 * | 4/2008 | Turvey et al. | 383/33 |
| 7,410,298 B2 * | 8/2008 | Pawloski | 383/61.2 |
| 7,410,453 B2 * | 8/2008 | Fenzl et al. | 493/213 |
| 7,904,995 B2 * | 3/2011 | Bois | 24/399 |
| 8,066,434 B2 * | 11/2011 | Nanba et al. | 383/204 |
| 2002/0094138 A1 * | 7/2002 | Schneider | 383/5 |
| 2003/0223652 A1 * | 12/2003 | Schneider | 383/5 |
| 2003/0228078 A1 * | 12/2003 | Clune et al. | 383/93 |
| 2003/0235352 A1 * | 12/2003 | Plourde et al. | 383/204 |
| 2003/0236158 A1 * | 12/2003 | Pawloski et al. | 493/394 |
| 2004/0078938 A1 * | 4/2004 | Pawloski | 24/400 |
| 2004/0078939 A1 * | 4/2004 | Pawloski | 24/400 |
| 2004/0131283 A1 * | 7/2004 | Sprague et al. | 383/61.2 |
| 2005/0238265 A1 * | 10/2005 | Schneider et al. | 383/203 |
| 2005/0271307 A1 * | 12/2005 | Pawloski et al. | 383/63 |
| 2005/0286810 A1 * | 12/2005 | Sprague et al. | 383/61.2 |
| 2005/0286811 A1 * | 12/2005 | Sprague et al. | 383/61.2 |
| 2005/0286812 A1 * | 12/2005 | Sprague et al. | 383/61.2 |
| 2006/0062496 A1 * | 3/2006 | Clune et al. | 383/95 |
| 2007/0206888 A1 * | 9/2007 | Chang | 383/200 |
| 2007/0258663 A1 * | 11/2007 | Plourde et al. | 383/9 |
| 2008/0031552 A1 * | 2/2008 | Tanaka et al. | 383/63 |
| 2009/0238500 A1 * | 9/2009 | Nanba et al. | 383/203 |
| 2009/0297071 A1 * | 12/2009 | Koenigkramer et al. | 383/63 |
| 2010/0215291 A1 * | 8/2010 | Nanba et al. | 383/63 |
| 2010/0266224 A1 * | 10/2010 | Nanba et al. | 383/204 |
| 2011/0150370 A1 * | 6/2011 | Tanaka et al. | 383/61.3 |
| 2011/0162329 A1 * | 7/2011 | So | 53/469 |
| 2011/0176751 A1 * | 7/2011 | Anzini et al. | 383/63 |
| 2012/0207409 A1 * | 8/2012 | Katada et al. | 383/63 |

FOREIGN PATENT DOCUMENTS

| | | |
|---|---|---|
| JP | 10-59384 A | 3/1998 |
| JP | 2004-244027 A | 9/2004 |
| JP | 2004-276925 A | 10/2004 |

* cited by examiner

EASILY TEARABLE FASTENER TAPE, METHOD OF PRODUCING THE FASTENER TAPE, PACKAGING BAG WITH EASILY TEARABLE FASTENER TAPE, AND DEVICE AND METHOD FOR PRODUCING THE PACKAGING BAG

TECHNICAL FIELD

The present invention relates to an easily tearable zipper tape, method of producing the zipper tape, package bag with the easily tearable zipper tape and a device and a method for producing the package bag.

BACKGROUND ART

As a package for packaging various articles such as food, medicine, medical products and miscellaneous goods, package bags provided with a zipper tape have been used, in which a pair of belt-shaped zipper tapes respectively including a male member and a female member that are mated with each other is disposed on an opening, the zipper tapes capable of being opened from the mated state and closable again.

Such package bags provided with a zipper tape are sealed at an upper side of the zipper tape. When the package bags are to be opened, films forming a bag body are torn apart starting from notches and the like provided on both sides of the package bag.

When the package bag provided with the zipper tape is to be thus opened, since the film is cut at a position adjacent to the zipper tape, it become difficult to pinch the bag body. Accordingly, a technique has been desired that allows the film of the bag body to be cut at a predetermined position.

In Patent Document 1, an opening string is disposed on a part of a zipper tape. The opening string is pulled to tear a film of the bag body. In Patent Document 2, a tearable resin is used in a tape section of a zipper tape to guide the tearing in cutting the film. Further, in Patent Document 3, a highly rigid cut tape is used in order to be cut at a predetermined position.

[Patent Document 1] JP-A-2004-276925
[Patent Document 2] JP-A-2004-244027
[Patent Document 3] JP-A-10-059384

DISCLOSURE OF THE INVENTION

Problems to Be Solved by the Invention

In Patent Document 1, however, since the opening string is disposed on a part of the zipper tape, in order to tear the film with the opening string, a part or the entirety of the zipper tape has to be simultaneously cut, thus making it difficult for children and aged men to open the bag.

In Patent Document 2, since the easily tearable resin consists of a single incompatible resin mixture of crystalline polyolefin and a cyclic polyolefin, the layer of the easily tearable resin may not be wholly mixed to be separately peeled off to generate minute thread or fibrous chips from the torn zipper.

In Patent Document 3, the cut tape and a guide line for exhibiting linear cutting properties are post-attached to the zipper tape or are attached in a bag-making machine, which complicates a bag-making process.

Further, since no guide is provided in the above methods, the zipper tape is also cut when a not-easily-tearable film is cut.

An object of the invention is to provide an easily-tearable zipper tape that allows a package bag to be opened at a predetermined position without generating cutting chip when the package bag is opened by tearing the zipper tape, a producing method of the easily-tearable zipper tape, a package bag provided with the easily-tearable zipper tape, a producing device and a producing method of the package bag.

Means for Solving the Problems

An easily-tearable zipper tape according to an aspect of the invention is attached to an inner surface of a package bag, the zipper tape including: an engagement portion at which a pair of male member and a female member are mated with each other; and belt-shaped bases provided continuously to the engagement portion, at least one of the belt-shaped bases including: a main body on which the engagement portion is provided; a first projecting portion provided on the main body on a side adjacent to an opening, the first projecting portion being thicker than the main body; a thin portion provided on the first projecting portion on a side adjacent to the opening, the thin portion being thinner than the first projecting portion and the main body; and second projecting portion provided on the thin portion on a side adjacent to an opening, the second projecting portion being thicker than the thin portion and the main body, opposing surfaces of the first projecting portion and the second projecting portion respectively facing the inner surface of the bag body being substantially coplanarly positioned, the thin portion being recessed relative to the opposing surfaces to provide a level difference, the thin portion defining a tearing guide piece.

According to the above aspect of the invention, the first projecting portion is provided on the main body in which the engagement portion is provided on a side adjacent to the opening. The thin portion that is thinner than the first projecting portion and the main body is provided on the first projecting portion on a side adjacent to the opening and the second projecting portion that is thicker than the thinner portion and the main body is provided on the thinner portion on a side adjacent to the opening. In other words, the thin portion is interposed between the thick first and second projecting portions.

Since the thin portion is provided, the thin portion is cut as a tearing guide piece when the bag is to be opened. Even when the cutting line is off the thin portion, the thick first projecting portion and the second projecting portion are not cut, so that the cutting line can be returned to the position of the thin portion. Further, since the first projecting portion remains after cutting to provide a portion thicker than the main body, a finger can be easily hooked to the first projecting portion, thus facilitating pinching operation.

Further, since the first and the second projecting portions are thicker than the main body, the tape is guided by the first and the second projecting portions to be cut. When the thickness of the main body is the same as the thickness of the first and the second projecting portions, the sealing temperature of the zipper tape becomes extremely high to deform the male and female members, which is not practicable.

Accordingly, when a package bag attached with the zipper tape is to be opened, the thin portion is used as a tearing guide piece, which is torn to open the bag with ease.

Further, since the thin portion is recessed relative to the surfaces of the first and the second projecting portions to be attached to the inner surface of the bag body, when the zipper tape is attached to the inner surface of the package bag, a space is provided between the thin portion and the base material film. The thin portion can be further easily cut on account of the presence of the space.

Further, with such an arrangement, a level difference is provided between the thin portion and the first and the second projecting portions, so that the thin portion is inclined to be cut along the level difference when the package bag attached with the zipper tape is opened. Accordingly, linearity can be given to the cutting of the base material film when the package bag is opened.

Further, since the thickness of the main body of the belt-shaped base remains unchanged while only the first and the second projecting portions are made thick, the sealability of the main body of the zipper tape is not affected.

In the easily-tearable zipper tape of the above aspect of the invention, it is preferable that the belt-shaped bases of the male member and the female member respectively includes the main body, the first projecting portion, the thin portion and the second projecting portion.

According to the above arrangement, since the first projecting portion, the thin portion and the second projecting portion are provided on both of the pair of the male member and the female member of the zipper tape, the zipper tape can be applied to a package bag provided with a zipper tape in which both of the thin portions provided on the male and female members and the base material film of the package bag are simultaneously torn apart to be opened. In the above, notches are provided on both ends of the thin portions, so that the thin portions and the base material films that are overlaid with each other can be simultaneously torn apart starting from the notches.

In easily-tearable zipper tape according the above aspect of the invention, lengths of the thin portion provided on the male member and the thin portion provided on the female member may be different.

With the above arrangement, since the length of the thin portion provided on the male member and the length of the thin portion provided on the female member are different, a level difference is provided on the opposing thin portions.

When a package bag attached with the above zipper tape is torn to be opened, the cutting lines of the opposing base material films are not aligned, so that the base material film at the opening of the package bag can be easily pinched in re-opening the bag.

In the easily-tearable zipper tape of the above aspect of the invention, it is preferable that one of the belt-shaped bases provided on the male member and the female member includes the main body, the first projecting portion, the thin portion and the second projecting portion, and the other of the belt-shaped bases includes the main body and the first projecting portion.

According to the above arrangement, since the thin portion and the second projecting portion are provided on the belt-shaped base of only one of the male member and the female member, when the bag is opened, the thin portion provided on one of the male member and the female member and the base material film of the package bag opposing thereto are simultaneously cut. Since the thin portion is provided only on one side, the bag can be opened with less force. Further, since the level differences are provided between the thin portion and the first and the second projecting portions, the tape is cut along either one of the level differences and along the level difference formed on an end surface of the first projecting portion of the opposing belt-shaped base adjacent to the opening. Accordingly, the linearity of the cutting line can be maintained.

In the easily-tearable zipper tape according to the above aspect, it is preferable that one or more ribs having the same height as a thickness of the first projecting portion and the second projecting portion are provided on the main body on a closed side relative to the engagement portion.

According to the above arrangement, one or more of the ribs are provided so that the height of the easily-tearable zipper tape becomes equal at the side adjacent to the opening and the closed side. With the above arrangement, when the easily-tearable zipper tape is fused onto the inner surface of the bag body, the seal bar uniformly touches the entire surface of the zipper tape, so that the zipper tape is accurately fused in a stable manner.

In the easily-tearable zipper tape according to the above aspect of the invention, it is preferable that a thickness of the thin portion is 0.12 mm or less, and the thickness of the first projecting portion and the second projecting portion is 0.20 mm or more and 1 mm or less.

According to the above arrangement, since the thickness of the thin portion is 0.12 mm or less, the thin portion can be easily cut. When the thickness of the thin portion exceeds 0.12 mm, cutting properties are deteriorated on account of greater tearing resistance.

Further, since the thickness of the second projecting portion and the first projecting portion of the main body is in a range between 0.20 mm to 1 mm, the tape is not cut at the position of the second projecting portion and the first projecting portion of the main body. When the thickness is less than 0.20 mm, the zipper tape itself may be cut when the bag is opened. On the other hand, when the thickness is more than 1 mm, sealability and sealing efficiency when producing the bag may be deteriorated. More preferably, the thickness is in a range between 0.3 to 0.5 mm.

In the easily-tearable zipper tape according to the above aspect of the invention, it is preferable that a width of the thin portion is 0.5 mm or more and 5 mm or less.

The width of the thick portion refers to a distance between the first projecting portion and the second projecting portion provided on both sides of the thin portion.

According to the above arrangement, since the width of the thin portion is in a range between 0.5 mm and 5 mm, the tape can be reliably cut at the position of the thin portion. When the width of the thin portion is less than 0.5 mm, the thin portion is not easily cut. On the other hand, when the width of the thin portion exceeds 5 mm, the tape may be cut over the first and the second projecting portions. More preferably, the width is in a range between 1 mm and 3 mm.

In the easily-tearable zipper tape according to the above aspect of the invention, it is preferable that the first projecting portion, the second projecting portion and the thin portion are made of random polypropylene.

With the above arrangement, since the first projecting portion, the second projecting portion and the thin portion are made of random polypropylene, excellent splittability can be obtained and no cutting chip is generated at the cut portion.

In the easily-tearable zipper tape according to the above aspect of the invention, it is preferable that the first projecting portion and the second projecting portion are provided by a same kind of resins, the thin portion is provided by a kind of resin different from the resins of the first projecting portion and the second projecting portion, and the main body is provided by a kind of resin different from the resin of the first projecting portion and the second projecting portion.

The resin used for the first and the second projecting portions is not specifically limited. For instance, low-density polyethylene, linear low-density polyethylene, polypropylene and polystyrene may be used. Any resin may be used for the main body as long as the engagement portion of the zipper tape is re-openable and re-closable, which may be the same resin used for the first and the second projecting portions. On the other hand, any resin that is highly compatible with the above resin and exhibits excellent cutting properties may be used for the thin portion. Examples of such a resin include low-density polyethylene, linear low-density polyethylene, polypropylene, polyethylene terephthalate, polybutylene terephthalate and cycloolefin copolymer. Any combination of the above resins is applicable as long as different resins are used for the thin portion and the first and the second projecting portions and for the first projecting portion and the main body.

Since the easily-tearable zipper tape is provided by different kind of resins, interlayer peeling occurs between the thin portion and the second projecting portion, between the thin portion and the first projecting portion or between the first projecting portion and the main body, so that excellent splittability is exhibited and no cutting chip is generated from the cut portion. Further, linearity can be given to the cutting line.

In the easily-tearable zipper tape according to above aspect of the invention, it is preferable that the first projecting portion, the second projecting portion and the thin portion are provided by a same kind of resins, and the main body is provided by a kind of resin different from the resin of the first projecting portion, the second projecting portion and the thin portion.

The resin used for the first and the second projecting portions and the thin portion is not specifically limited. For instance, low-density polyethylene, linear low-density polyethylene, polypropylene and polystyrene may be used. The resin used for the main body also is not specifically limited. Any resin may be used from the above resins so that the resin used for the main body is different from the resin used for the first projecting portion, the second projecting portion and the thin portion.

With the above arrangement, since interlayer peeling occurs between the first projecting portion and the main body that are made of different resins, excellent splittability can be obtained and no cutting chip is generated at the cut portion.

In the easily-tearable zipper tape according to the above aspect of the invention, it is preferable that the first projecting portion, the second projecting portion, the thin portion and the main body are respectively provided by different kind of resins.

The resin to be used is not specifically limited, where low-density polyethylene, linear low-density polyethylene, polypropylene, polystyrene and the like may be used as in the above so that different resins are used for the first projecting portion, the second projecting portion, the thin portion and the main body.

With the above arrangement, since the different kind of resins are used for the respective components, interlayer peeling occurs between the thin portion and the second projecting portion, between the thin portion and the first projecting portion or between the first projecting portion and the main body, so that excellent splittability is exhibited and no cutting chip is generated from the cut portion.

In the easily-tearable zipper tape according to the above aspect of the invention, it is preferable that a seal layer is provided on a surface of the first projecting portion, the second projecting portion and the main body to be attached to the inner surface of the bag body.

With the above arrangement, since the seal layer is provided, a resin of excellent compatibility with the resin used for the sealant layer of the bag body can be selectably used for the seal layer. Accordingly, irrespective of the resin used for the bag body, an easily-tearable zipper tape having excellent adhesion properties can be provided.

In the easily-tearable zipper tape according to the above aspect of the invention, it is preferable that a melting point of the resin forming the seal layer is lower than a melting point of the resin forming the first projecting portion, the second projecting portion and the main body, and includes:

(A) 50 mass % or more and 100 mass % or less of metallocene-type linear low-density polyethylene having a density of 920 kg/m$^3$ or less and MFR of 5.0 g/10 min or less; and (B) 0 mass % or more and 50 mass % or less of a composition consisting of propylene and α-olefin copolymer having 4 to 8 carbon atoms.

With the above arrangement, since the resin containing the above components (A) and (B) in the seal layer is used, an easily-tearable zipper tape with excellent adhesion properties with the bag body can be provided.

A producing method of the easily-tearable zipper tape according to another aspect of the invention includes: co-extruding the main body provided with the engagement portion, the first projecting portion, the second projecting portion and the thin portion in a single step.

With the above arrangement, since the easily-tearable zipper tape is produced by co-extrusion in a single step, the producing process can be simplified and facilitated.

A package bag provided with an easily-tearable zipper tape according to still another aspect of the invention includes: the easily-tearable zipper tape according to any one of claims 1 to 13, and a bag body on which the easily-tearable zipper tape is attached, where a space is defined by: an inner surface of the bag body; a surface of the thin portion facing the inner surface of the bag body; and surfaces of the first projecting portion and the second projecting portion intersecting the surface of the thin portion.

With the above arrangement, since the space is defined by the inner surface of the bag body, the thin portion and the first and the second projecting portions in the package bag provided with an easily-tearable zipper tape, the same advantages as mentioned above can be attained.

In the package bag provided with an easily-tearable zipper tape according to the above aspect of the invention, it is preferable that a side seal portion is provided in a direction intersecting the easily-tearable zipper tape, and the thin portion is widened at the side seal portion than the thin portion located on an inner side of the side seal portion.

With the above arrangement, since the thin portion on the side seal portion of the package bag is provided in an enlarged manner, a notch can be securely provided on the thin area, thus providing a package bag provided with a zipper tape that exhibits an excellent easily-tearability.

A producing device for producing the package bag provided with an easily-tearable zipper tape according to further aspect of the invention, includes: a pair of point seal bars that collapse the thin portion at the side seal portion, at least one of the pair of point seal bars comprising a convex portion of which height is greater than a height of the space.

In a conventional method, when the thin portion in the side seal portion is to be collapsed, molten resin enters the thin portion to thicken or narrow the thin portion in the side seal portion, so that a notch is difficult to be provided.

According to the above aspect of the invention, since the end surface of the convex portion provided on the point seal bar initially touches to melt the thin portion, the molten resin of the first and the second projecting portions that are subsequently melted does not enter into the thin portion. Accordingly, the width and thickness of the thin portion can be maintained. Further, the convex portion is preferably substantially trapezoidal so that the width of the thin portion can be enlarged.

Accordingly, a notch can be reliably provided on the thin portion in the side seal portion in a stable manner, thus providing a product with excellent splittability and quality.

In the producing device of the package bag provided with an easily-tearable zipper tape according to the above aspect of the invention, it is preferable that the pair of point seal bars include a plurality of pairs of point seal bars respectively having differently sized contact surface on the convex portion.

According to the above aspect of the invention, since a plurality of point seal bars having differently sized contact surface on the convex portion are provided, a multiple stage of sealing processes can be conducted starting from the one of the plurality of point seal bars having the smallest contact surface. Accordingly, the thin portion can be reliably spread to be thin and wide.

A producing method for producing the package bag provided with an easily-tearable zipper tape using the producing device according to still further aspect of the invention, includes: when the thin portion is collapsed, aligning the convex portion with a position of the thin portion; and melting and flattening the thin portion from a center of the thin portion toward an outside.

According to the above aspect of the invention, the width of the thin portion can be maintained as mentioned above. Further, since the thin portion is melted to be flattened, the thin portion can be spread to be thin and wide. Accordingly, a notch can be reliably provided on the thin portion in the side seal portion in a stable manner, thus providing a product with excellent splittability and quality.

A producing method for producing the package bag provided with an easily-tearable zipper tape using the producing device according to still further aspect of the invention, where: the pair of point seal bars include a plurality of pairs of point seal bars respectively having differently sized contact surface on the convex portion, and a sealing process is sequentially conducted starting from one of the pairs of point seal bars having the smallest contact surface on the convex portion.

According to the above arrangement, since the sealing process is sequentially conducted starting from the one of the plurality of point seal bars having the smallest contact surface on the convex portion, the thin portion can be more stably flattened. Accordingly, the thin portion can be reliably spread to be thin and wide, thus facilitating the formation of the notch.

BEST MODE FOR CARRYING OUT THE INVENTION

Exemplary embodiment(s) of the invention will be described below with reference to the attached drawings. In the description of the embodiment(s), the explanation of the components with the same reference sign will be simplified or omitted.

First Embodiment

Initially, a first exemplary embodiment of the invention will be described below with reference to FIGS. 1 and 2.

Figure 1:
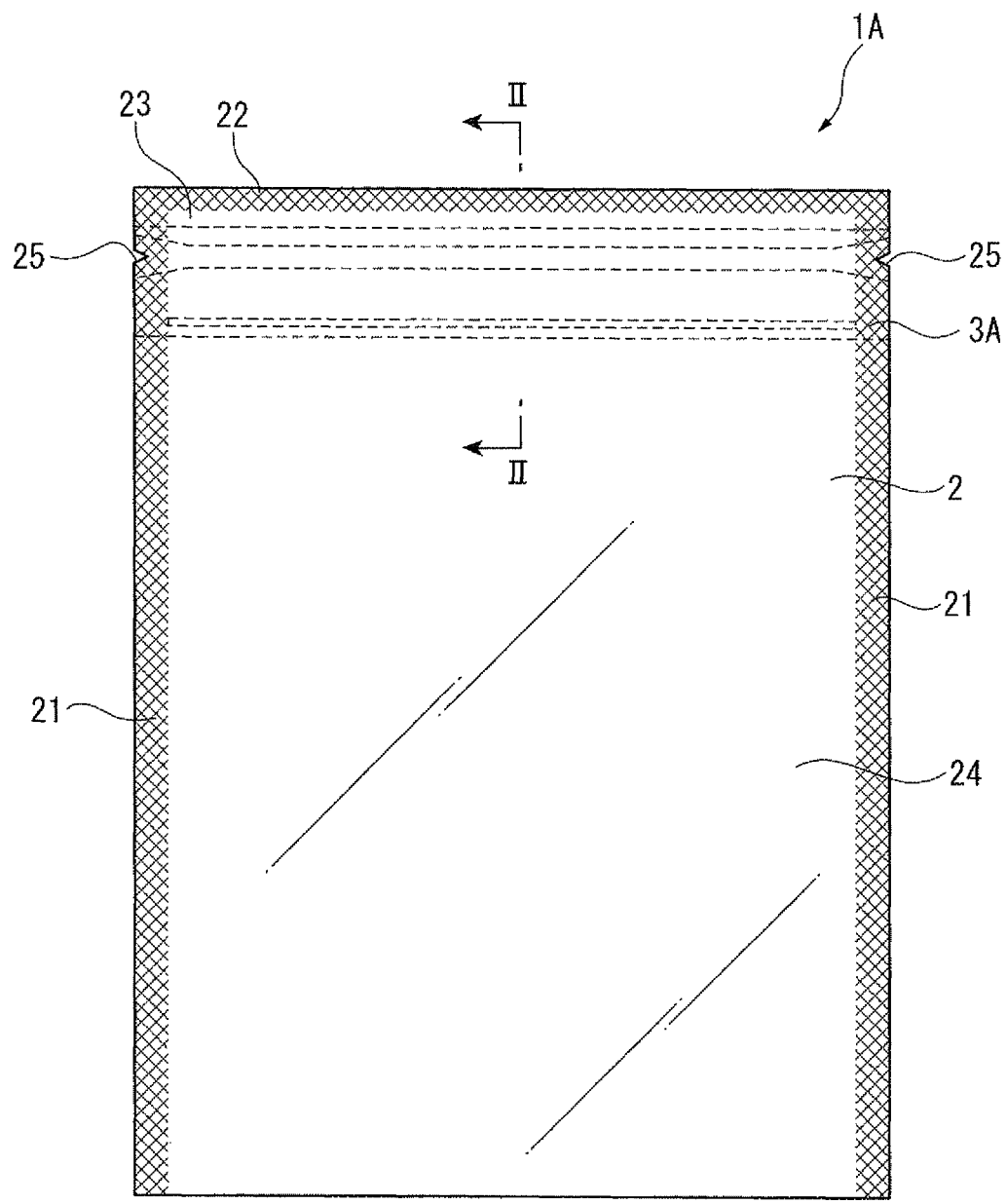
FIG. 1 is a front elevational view showing a package bag provided with a zipper tape according to a first exemplary embodiment of the invention.

As shown in FIG. 1, a package bag 1A provided with a zipper tape according to the exemplary embodiment includes a bag body 2 provided by overlaying base material films 24 (package material) with each other and forming side seal portions 21 and a top seal portion 22 on the periphery thereof. A zipper tape 3A is attached to an inner surface of an opening 23 of the bag body 2.

Figure 2:
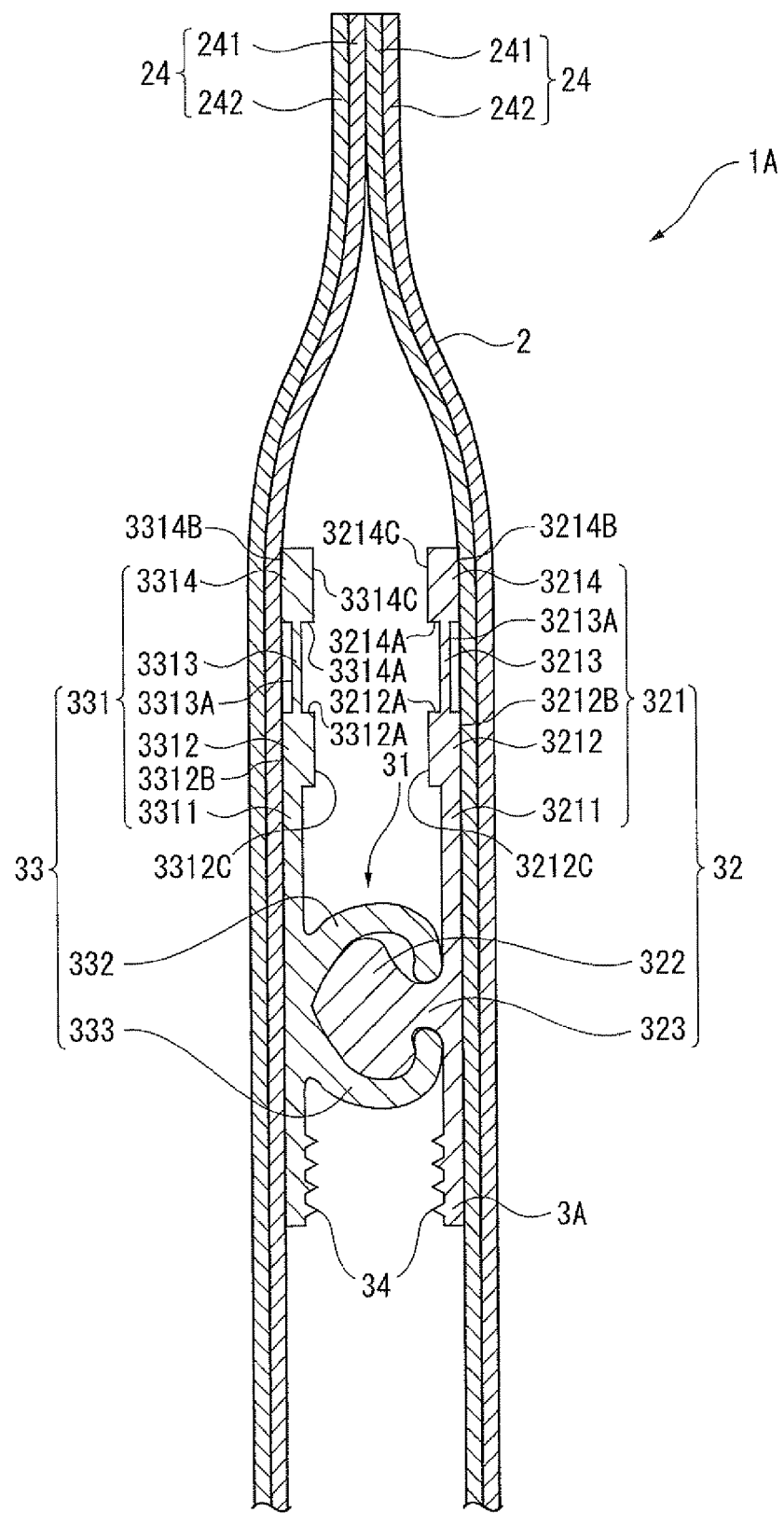
FIG. 2 is a cross section taken along II-II segment in FIG. 1.

FIG. 2 shows a cross section of the zipper tape 3A. As shown in the cross section of the zipper tape 3A, the zipper tape 3A includes a pair of a male member 32 and a female member 33. The male member 32 has a united arrangement of a belt-shaped base 321 bonded to the bag body 2, a head 322 having a substantially arrow-tip shaped cross section, and a connecting portion 323 for connecting the belt-shaped base 321 and the head 322. Similarly to the above-described male member 32, the female member 33 includes a belt-shaped base 331 bonded to the bag body 2, and a first and second hooking portions 332 and 333 connected to the belt-shaped base 331 and exhibiting an arc cross section. The first hooking portion 332 and the second hooking portion 333 are opposed with each other.

An engagement portion 31 of the zipper tape 3A is provided by the head 322 of the male member 32 and the first and the second hooking portions 332 and 333 of the female member 33, which are disengaged and engaged to open and reclose the bag.

The belt-shaped base 321 includes: a main body 3211 on which the engagement portion 31 is provided; a first projecting portion 3212 provided on an opening-side of the main body 3211; a thin portion 3213 connected to an opening-side of the first projecting portion 3212; and a second projecting portion 3214 connected to an opening-side of the thin portion 3213.

A surface 3212B of the first projecting portion 3212 on the side of the base material film 24 and a surface 3214B of the second projecting portion 3214 on the side of the base material film 24 are substantially coplanarly positioned. The thin portion 3213 is located at a position recessed relative to the surfaces 3212B and 3214B. Thus, a level difference is provided between the thin portion 3213 and the first and the second projecting portions 3212 and 3214.

Further, the position of the thin portion 3213 is also recessed relative to a surface 3212C of the first projecting portion 3212 on the side of the engagement portion 31 and a surface 3214C of the second projecting portion 3214 on the side of the engagement portion 31.

The thickness of the thin portion 3213 is preferably 0.12 mm or less. In the present exemplary embodiment, the thickness of the thin portion 3213 is 0.1 mm. The thickness of the main body 3211 is preferably 0.15 mm. The thickness of the first and the second projecting portions 3212 and 3214 of the main body 3211 is preferably in a range between 0.20 mm and 1 mm, which may exemplarily be set at 0.3 mm.

The width of the thin portion 3213 is preferably in a range between 0.5 mm and 5 mm, more preferably between 1 mm and 3 mm. In this exemplary embodiment, the width is set at 2 mm.

Ribs 34 having the same height as the height of the first and the second projecting portions 3212 and 3214 are provided on the main body 3211 of the belt-shaped base 321 on a closed side relative to the engagement portion 31. Though the number of the ribs 34 is not limited, four ribs 34 are provided in the present exemplary embodiment.

The belt-shaped base 331 also includes: a main body 3311 on which the engagement portion 31 is provided; a first projecting portion 3312 provided on an opening-side of the main body 3311; a thin portion 3313 connected to an opening-side of the first projecting portion 3312; and a second projecting portion 3314 connected to an opening-side of the thin portion 3313.

The thin portion 3313 is provided at the same location as the thin portion 3213 of the belt-shaped base 321, where a level difference is provided between the thin portion 3313 and the first and the second projecting portions 3312 and 3314.

The thickness of the respective portions are set similarly to that of the belt-shaped base 321, where the thickness of the thin portion 3313 is exemplarily 0.1 mm, the thickness of the main body 3311 is exemplarily 0.15 mm and the thickness of the first and the second projecting portions 3312 and 3314 of the main body 3311 is exemplarily 0.3 mm.

The width of the thin portion 3313 is 2 mm

Four ribs 34 are provided on the main body 3311 near the closed side relative to the engagement portion 31.

When thus arranged zipper tape 3A is fused to an inner surface of the bag body 2, a space is defined by a surface 3213A of the thin portion 3213 of the male member 32, the film of the bag body 2, and a surface 3212A of the first projecting portion 3212 and a surface 3214A of the second projecting portion 3214 intersecting the surface 3213A of the thin portion 3213. Similarly, a space is provided in the female member 33 by a surface 3313A of the thin portion 3313, the film of the bag body 2, and a surface 3312A of the first projecting portion 3312 and a surface 3314A of the second projecting portion 3314 intersecting the surface 3313A of the thin portion 3313.

Further, while the zipper tape 3A and the top and bottom base material films 24 are superposed, V-shaped notches 25 that provide an opening start position are respectively provided on both ends of the thin portion 3213 and the thin portion 3313 (FIG. 1).

The zipper tape 3A can be integrally produced by a co-extrusion molding. With the use of co-extrusion molding for producing the zipper tape 3A, the producing step can be simplified, the production cost can be lowered and the zipper tape 3A can be continuously produced in a stable manner.

Any material may be used for producing the male member 32 and female member 33 of the zipper tape 3A as long as the male and female members are reclosable. However, it is preferable that polyolefin-base resin including typical polyethylene-base resin such as low-density polyethylene and linear low-density polyethylene and polypropylene-base resin is used. Examples of the polypropylene-base resins are thermoplastic resin such as homo-polypropylene, block polypropylene, random polypropylene (RPP), propylene-ethylene-butene-1-random ternary copolymer, polyolefinic specialty soft resin (TPO resin. e.g. prime polymer TPO) and mixture of the resins.

The base material film 24 (package material) forming the bag body 2 is preferably a laminate film in which a sealant layer 241 is laminated on a base layer 242. However, in accordance with the performance desired, a laminate film in which an intermediate layer (not shown) such as a gas-barrier layer, light-shielding layer and strength-improving layer is laminated between the base layer 242 and the sealant layer 241 may alternatively be used.

As well as biaxially oriented polypropylene film (OPP film), a biaxially oriented polyester film such as a biaxially oriented polyethylene terephthalate film (PET film) and a biaxially oriented polyethylene naphthalate film (PEN film), and a biaxially oriented polyamide film such as nylon 6, nylon 66 and MXD6 (poly-(meta-xylylene adipamide)) can be suitably used for the base layer 242. Alternatively, various engineering plastic films may be used as necessary. These films may be singularly used or a combination of a plurality of the films may be used.

When the intermediate layer is a gas-barrier layer, the intermediate layer may be provided by a film of saponified ethylene-vinyl acetate copolymer (EVOH), polyvinylidene chloride (PVDC) and polyacrylonitrile (PAN), aluminum foil, a vapor-deposition layer of silica, alumina, aluminum and the like, or a coating layer of PVDC.

When a vapor-deposition layer of silica, alumina and aluminum or a coating film layer of PVDC is used as the intermediate layer, the intermediate layer may be vapor-deposited or coated on the inner surface of the base layer 242. Alternatively, the layer may be vapor-deposited or coated on a separate biaxially oriented nylon film (ONy film), biaxially oriented polyethylene terephthalate film (PET film), biaxially oriented polypropylene film (OPP film) and the like and thus prepared film may be laminated on the intermediate layer.

In the above, since aluminum foil and aluminum vapor-deposited layer are opaque, aluminum foil and aluminum vapor-deposited layer can also work as a light-shielding layer.

When the base layer 242 and the film of the intermediate layer are laminated, known dry lamination method or extrusion lamination method (sandwich lamination method) may be employed.

Low-density polyethylene, polypropylene (CPP) and the like can be used as the innermost sealant layer 241.

Incidentally, in order to laminate the sealant layer 241, the above resins may be formed as a film, which is to be laminated by a dry lamination or an extrusion lamination. Alternatively, the above resins may be laminated by extrusion coating to obtain the base material film 24.

With the use of thus obtained base material film 24 and the zipper tape 3A, the package bag 1A provided with the zipper tape is produced using a zipper-tape-attaching three-side seal bag-making machine and the like.

The zipper-tape-attaching three-side seal bag-making machine includes a package material feeder, a tape feeder and a zipper tape bonding section. After a pair of the base material films 24 are fed from the package material feeder, the zipper tape 3A fed from the tape feeder is disposed between the pair of the base material films 24 and the zipper tape 3A and the base material films 24 are bonded at the zipper tape bonding section.

Subsequently, the base material films 24 are transferred to be bonded and melt-cut at a predetermined interval in the transferring direction of the base material film 24 to form the package bag 1A provided with the zipper tape.

Figure 3:
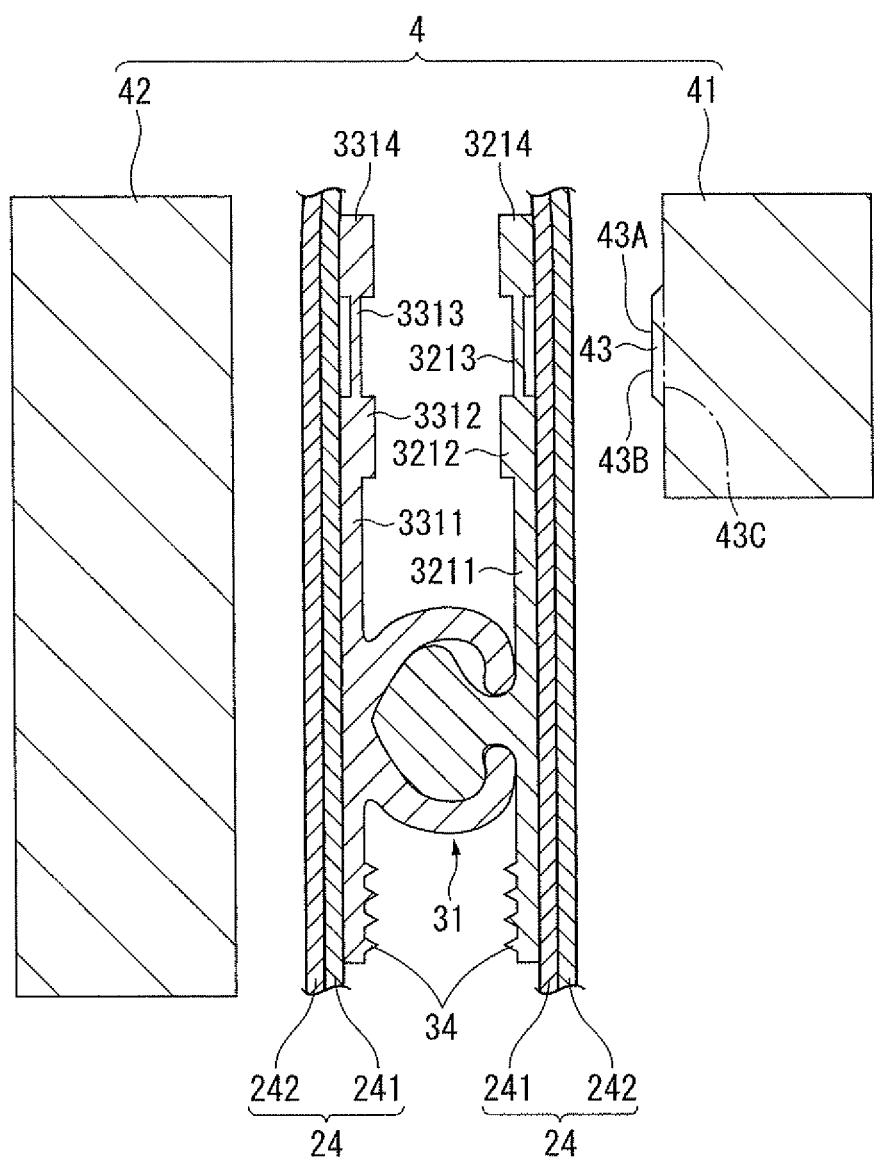
FIG. 3 is a cross section showing a point seal process according to the first exemplary embodiment.

When the side seal portion 21 of the package bag 1A provided with the zipper tape is formed, a point seal process for collapsing the zipper tape 3A is requisite. A cross section illustrating the point-seal process is shown in FIG. 3.

A producing machine 4 is provided with point seal bars 41 and 42. A convex portion 43 is provided on the point seal bar 41. Though the shape of the convex portion 43 is not limited, the cross section of the convex portion 43 is preferably substantially trapezoidal. A short side 43B of the substantially trapezoidal cross section is provided by a cut surface of an end surface 43A of the convex portion 43. A long side 43C of the substantially trapezoidal cross section is provided by a side opposing to the end surface 43A of the convex portion 43. The length of the short side 43B is 2 mm, which is the same as the width of the thin portion 3213. The length of the long side 43C is not limited as long as the long side 43C is longer than the short side 43B. In this exemplary embodiment, the length of the long side 43C is 4.2 mm. The height of the convex portion 43 is set higher than the height of the space provided between the thin portion 3213 or the thin portion 3313 and the base material film 24.

During the point seal process using the producing machine 4, the convex portion 43 is pressed onto the thin portions 3213 and 3313 over the base material films 24 to apply a force from the center of the thin portions 3213 and 3313 toward an outside to melt and flatten the zipper tape.

Incidentally, before point-sealing with the point seal bars 41 and 42, a point seal bar having a contact surface smaller than the contact surface of the convex portion 43 may be used to conduct a sealing process. According to the above arrangement, the flattening process can be more stably conducted.

Figure 4:
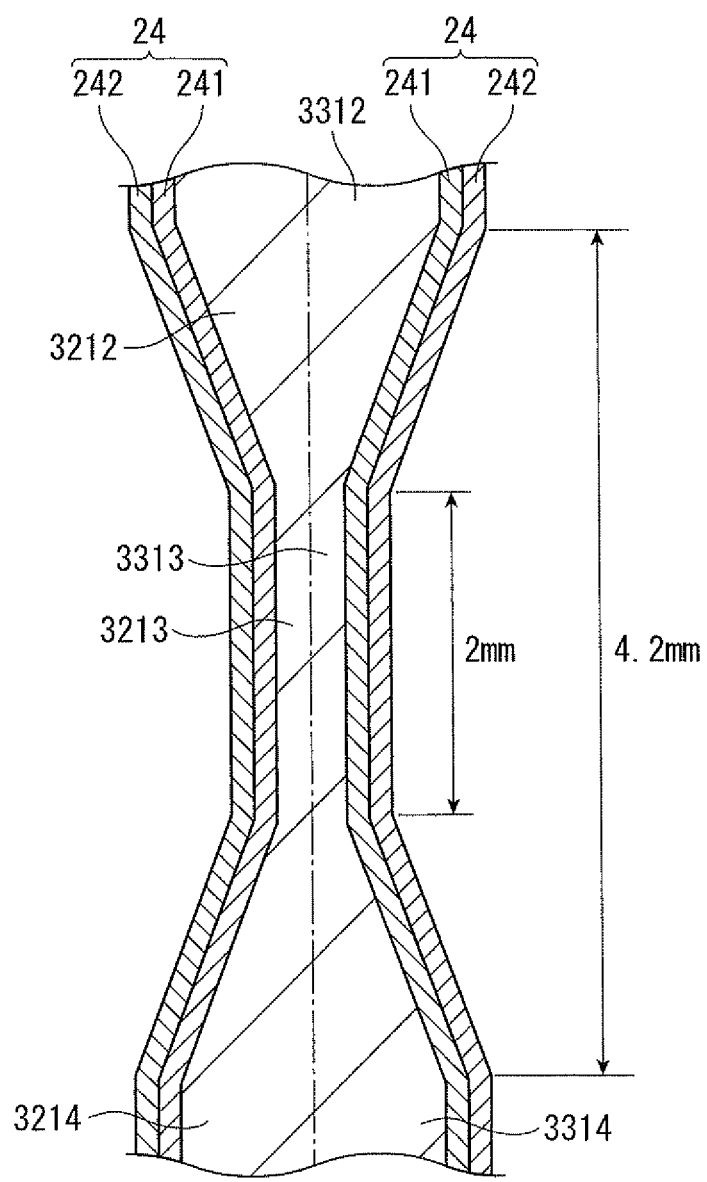
FIG. 4 is a cross section showing a thin portion of a side seal portion after completing the point seal process.

FIG. 4 shows a cross section of the thus-sealed thin portion at the side seal portion 21. The width of the thin portions 3213 and 3313 is maintained. Further, since the convex portion 43 having substantially trapezoidal cross section is used to seal, thin section wider than the thin portions 3213 and 3313 is provided.

Next, unsealing process of the package bag 1A provided with the zipper tape will be described below.

When the bag is unsealed, the base material film 24 adjacent to one of the notches 25 provided on both ends of the thin portions 3213 and 3313 are pinched on the opening side and on the content-side to tear the bag in a direction opposing with each other from the notch 25 (cut start position). Consequently, the thin portions 3213 and 3313 and the opposing base material films 24 can be torn at one time.

Then, the engagement portion 31 of the zipper tape 3A is disengaged to open the package bag 1A provided with the zipper tape. When being re-closed, the male member 32 and the female member 33 are engaged to bring the engagement portion 31 into an engaged state.

According to the above-described zipper tape 3A and the package bag 1A provided with the zipper tape, following advantages can be achieved.

(1) Since the zipper tape 3A of this exemplary embodiment is provided with the thin portions 3213 and 3313 on the opposing belt-shaped bases 321 and 331, the zipper tape 3A can be easily cut along the thin portions 3213 and 3313 when the package bag 1A provided with the zipper tape is to be opened.

Further, since the first projecting portions 3212 and 3312 and the second projecting portions 3214 and 3314 provided on both ends of the thin portions 3213 and 3313 are thicker than the thin portions 3213 and 3313, even when a cutting line is not aligned with the thin portions 3213 and 3313 in opening the bag, the first projecting portions 3212 and 3312 and the second projecting portions 3214 and 3314 are not cut.

When the zipper tape 3A is fused to the inner surface of the bag body 2, the space is defined by the film of the bag body 2, the surface 3213A of the thin portion 3213 opposing to the film of the bag body 2, and the surface 3212A of the first projecting portion 3212 and the surface 3214A of the second projecting portion 3214 intersecting the surface 3213A of the thin portion 3213. Accordingly, since a level difference is provided between the thin portion 3213 and the first projecting portion 3212 and between the thin portion 3213 and the second projecting portion 3214, the thin portion 3213 is easily cut along the level difference when the bag is to be opened. Further, since a level difference is provided on the side of the engagement portion 31 between the thin portion 3213 and the first and the second projecting portions 3212 and 3214, the bag is more likely to be cut between the thin portion 3213 and the first and the second projecting portions 3312 and 3214.

Incidentally, a space is also provided in the belt-shaped base 331 by the film of the bag body 2, the surface 3313A of the thin portion 3313 opposing to the film of the bag body 2, and a surface 3312A of the first projecting portion 3312 and a surface 3314A of the second projecting portion 3314 intersecting the surface 3313A of the thin portion 3313. Accordingly, since a level difference is provided between the thin portion 3313 and the first projecting portion 3312 and between the thin portion 3313 and the second projecting portion 3314, the thin portion 3313 is easily cut along the level difference when the bag is to be opened. Further, since a level difference is provided on the side of the engagement portion 31 between the thin portion 3313 and the first and the second projecting portions 3312 and 3314, the bag is more likely to be cut between the thin portion 3313 and the first and the second projecting portions 3312 and 3314.

Accordingly, linearity can be provided to the cutting line, so that easy-openability can be achieved without damaging the zipper tape 3A.

(2) The thickness of the thin portion is 0.12 mm or less, the thickness of the first and the second projecting portions is in a range between 0.20 mm and 1 mm, and the width of the thin portion is in a range between 0.5 mm and 5 mm. Accordingly, the thin portion is easily cut while the first and the second projecting portions are not likely to be cut. Consequently, the tape is likely to be cut along the thin portion, so that linearity as well as easy-splittability can be provided to the cutting line. Further, since the first and the second projecting portions are not too thick, excellent sealability can be exhibited without influencing on the workability.

(3) The male member 32 provided with the main body 3211, the first projecting portion 3212, the thin portion 3213 and the second projecting portion 3214 and the female member 33 provided with the first projecting portion 3312, the thin portion 3313 and the second projecting portion 3314 can be respectively produced by co-extrusion in a single step. Accordingly, the respective components can be easily produced without requiring much work and cost.

(4) Since the four ribs 34 having the same height as the height of the first and the second projecting portions 3212 and 3214 are provided to the main body 3211 of the belt-shaped base 321 on a closed side relative to the engagement portion 31, the seal bar can be evenly touched to the entire surface of the zipper tape 3A when the zipper tape 3A and the base material film 24 are fused. Consequently, the zipper tape 3A can be securely and stably fused onto the base material film 24.

(5) Since the convex portion 43 is provided on the point seal bar 41, when being sealed with the use of the point seal bar 41, the thin portions 3213 and 3313 are initially brought into contact with the point seal bars 41 and 42 to be melted. As a result, the molten resin of the thick first and second projecting portions 3212 and 3214 does not enter into the thin portions 3213 and 3313, so that the width of the thin portions 3213 and 3313 can be maintained. Further, since the convex portion 43 has approximately trapezoidal cross section, the thin area can be enlarged. Consequently, the notch 25 can be stably provided, thus improving easy-splittability.

Second Embodiment

Next, second exemplary embodiment of the invention will be described below with reference to FIG. 5.

The second exemplary embodiment is the same as the first exemplary embodiment except that the lengths of the opposing thin portions 3213 and 3313 are different and that the resin used for the thin portions 3213 and 3313 is different from the resins used for the first projecting portions 3212 and 3312 and the second projecting portions 3214 and 3314 are different. Accordingly, detailed explanation of the common arrangement will not be mentioned below.

Figure 5:
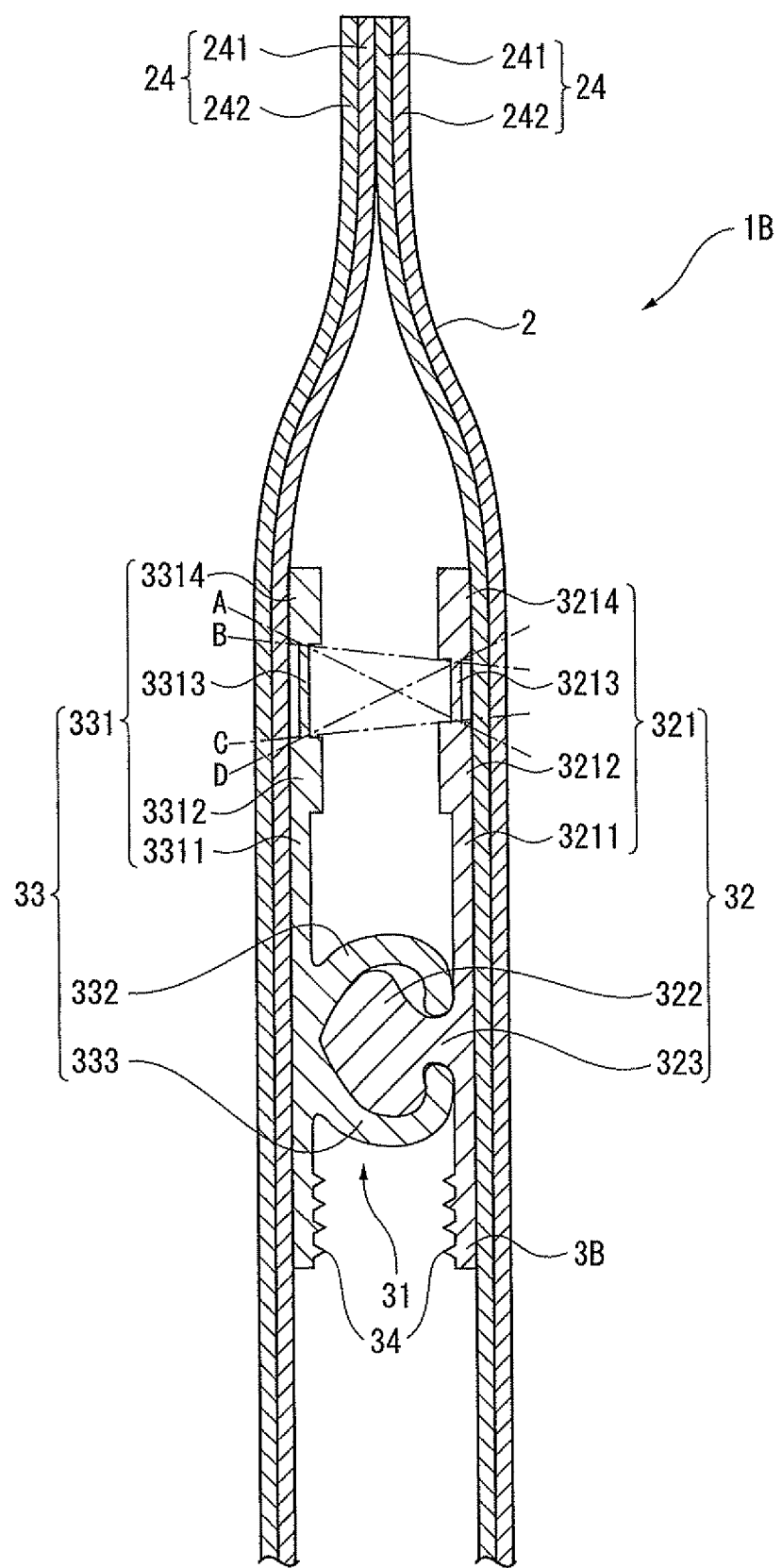
FIG. 5 is a cross section of a package bag provided with a zipper tape according to a second exemplary embodiment.

As shown in FIG. 5, the length of the thin portion 3213 of the male member 32 is shorter than the thin portion 3313 of the female member 33.

The resin used for the thin portion 3213 is different from the resin used for the second projecting portion 3214 and the first projecting portion 3212 provided on both ends of the thin portion 3213. The used resin is the resins used in the first exemplary embodiment, from which a combination of different resins can be selected as necessary. For instance, low-density polyethylene and polypropylene can be selected.

When being opened, interlayer peeling occurs between the thin portion 3213 and 3313 and the second projecting portions 3214 and 3314, or between the thin portions 3213 and 3313 and the first projecting portions 3212 and 3312. As shown in A to D in FIG. 5, the peeling occurs at different levels in all of the cutting surfaces.

With the arrangement of this second exemplary embodiment, the following advantages as well as the same advantages as the first exemplary embodiment can be attained.

(6) Since the lengths of the opposing thin portions 3213 and 3313 differ in the second exemplary embodiment, when the package bag 1B attached with the zipper tape 3B is opened, the opposing base material films 24 are cut at different levels.

Accordingly, when the re-closed package bag 1B is re-opened, the base material film 24 at the opening can be easily pinched.

(7) Further, the resin used for the thin portion 3213 is different from the resin used for the first and the second projecting portions 3212 and 3214. Accordingly, interlayer peeling is likely to occur between the thin portion and the first and the second projecting portions, so that linearity can be given to the cutting line. Further, since interlayer peeling occurs between the thin portion and the projecting portion(s), no cutting chip is generated from the torn portion, so that sanitary product can be provided.

Third Embodiment

Figure 6:
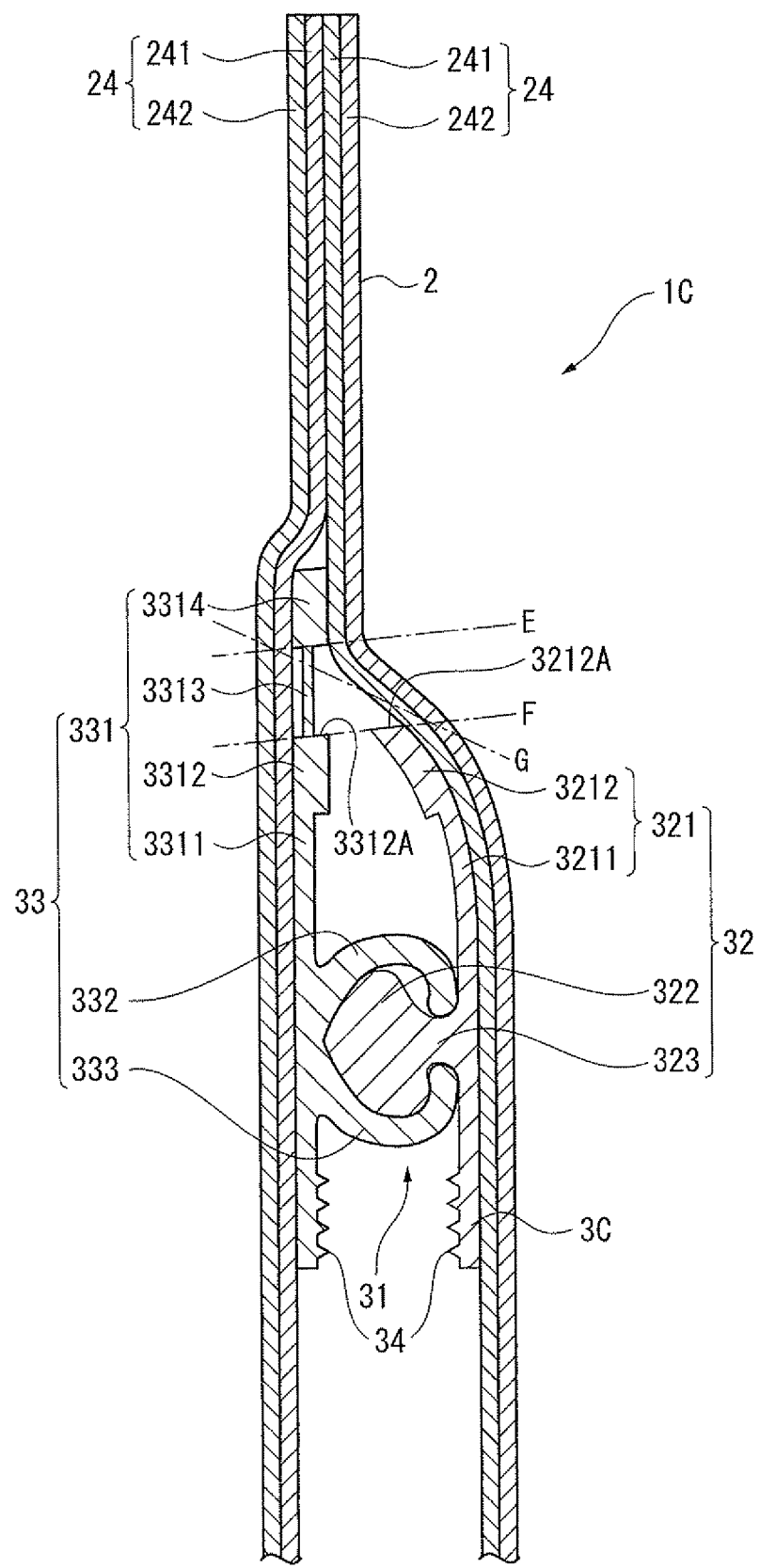
FIG. 6 is a cross section of a package bag provided with a zipper tape according to a third exemplary embodiment.

Next, third exemplary embodiment of the invention will be described below with reference to FIG. 6.

The third exemplary embodiment is the same as the first exemplary embodiment except that a zipper tape 3C is provided with the thin portion 3313 and the second projecting portion 3314 only on the belt-shaped base 331 of the female member 33. The length of the belt-shaped base 321 of the male member 32 is preferably adjusted so that the position of the opening-side end-surface 3212A is not aligned with a boundary surface 3312A between the first projecting portion 3312 and the thin portion 3313 of the female member 33. Accordingly, since the opposing base material films 24 are unevenly (asymmetrically) cut along cutting lines F to G, the base material film 24 can be easily pinched when the bag is re-opened. Incidentally, the package bag 1C provided with the zipper tape is sealed while the second projecting portion 3314 and the opposing base material film 24 are fused.

With the arrangement of this third exemplary embodiment, the following advantages as well as the same advantages as the first exemplary embodiment can be attained.

(8) Since the zipper tape 3C having the thin portion 3313 only on the female member 33 is used, the bag is cut to be opened along cutting lines F, G or E connecting: the level difference between the thin portion 3313 and the second projecting portion 3314 or between the thin portion 3313 and the first projecting portion 3312; and the opposing first projecting portion 3212.

Since the thin portion 3313 is provided only on one side, the bag can be opened with smaller force, thus achieving easy-openability.

Further, since the first and the second projecting portions 3312 and 3314 are thicker than the thin portion 3313, even when the cutting line goes off an intended cutting line, the cutting line can be returned to an original cutting position.

Incidentally, it should be understood that the scope of the present invention is not limited to the above-described exemplary embodiments, but includes modifications and improvements as long as the modifications and improvements are compatible with the invention. Further, the specific arrangements and configurations may be altered in any manner as long as an object and effect of the invention can be achieved.

Figure 7:
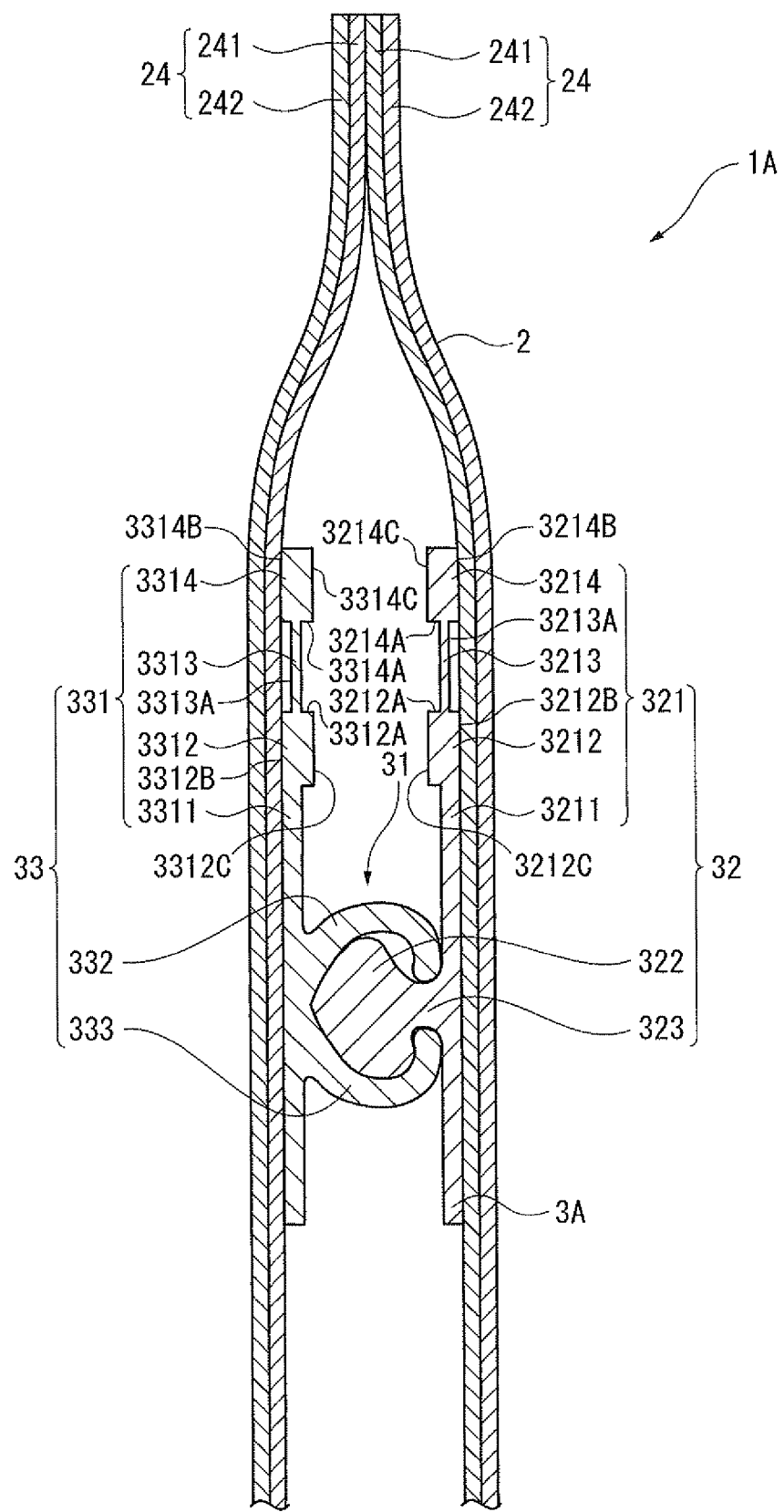
FIG. 7 is a cross section showing a modification of the exemplary embodiment shown in FIG. 2.

For instance, though the four ribs 34 are provided on the main bodies 3211 and 3311 of the belt-shaped bases 32 and 33 on a closed side relative to the engagement portion 31 in this exemplary embodiment, the number of the ribs 34 is not restricted. Further, the rib 34 may not be provided as shown in FIG. 7.

Figure 8:
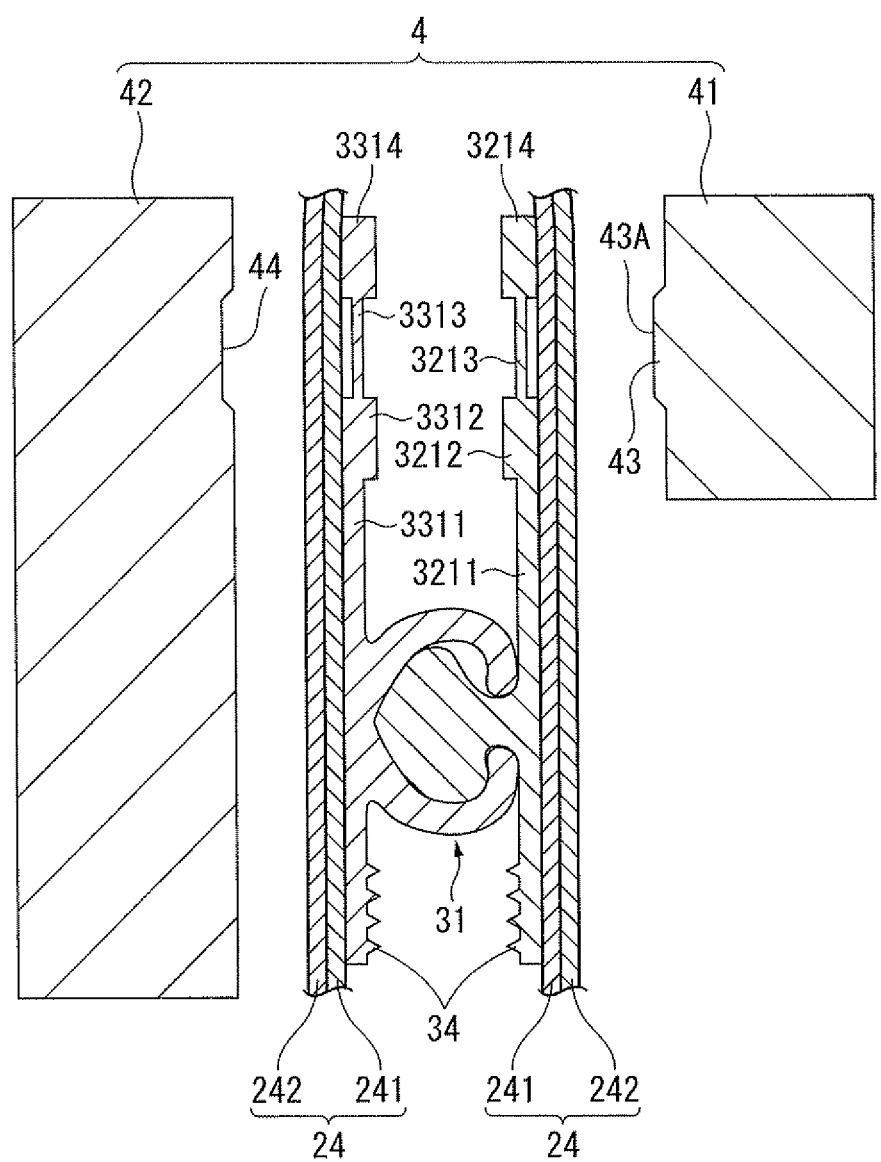
FIG. 8 is a cross section showing a modification of the point seal process shown in FIG. 3.
Figure 9:
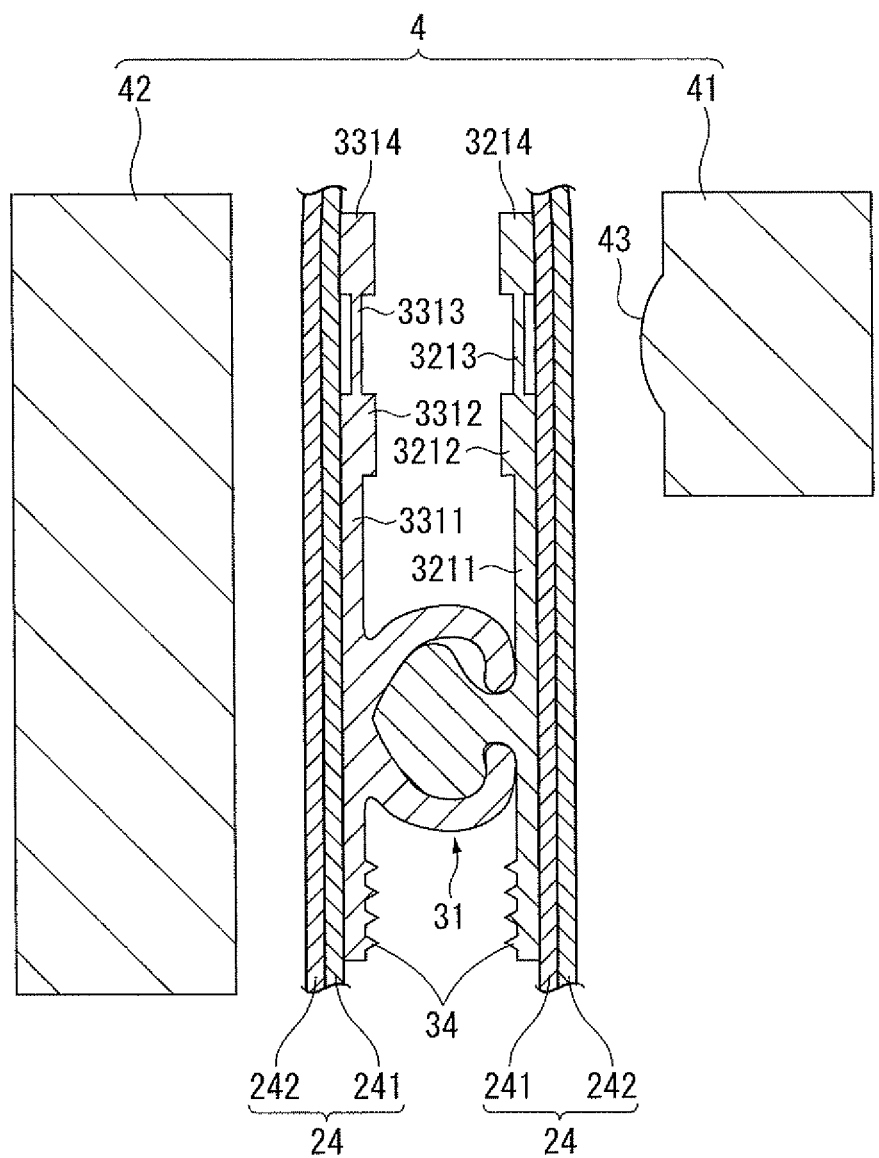
FIG. 9 is a cross section showing another modification of the point seal process shown in FIG. 3.

Though the convex portion 43 is provided on the point seal bar 41 in order to collapse the thin portion at the side seal portion 21, a recessed portion 44 to be fitted with the convex portion 43 may be provided on the point seal bar 42 as shown in FIG. 8. With such an arrangement, the thin portion can be reliably spread to be thin and wide. Alternatively, the convex portion 43 may have a substantially arc cross section as shown in FIG. 9.

Figure 10:
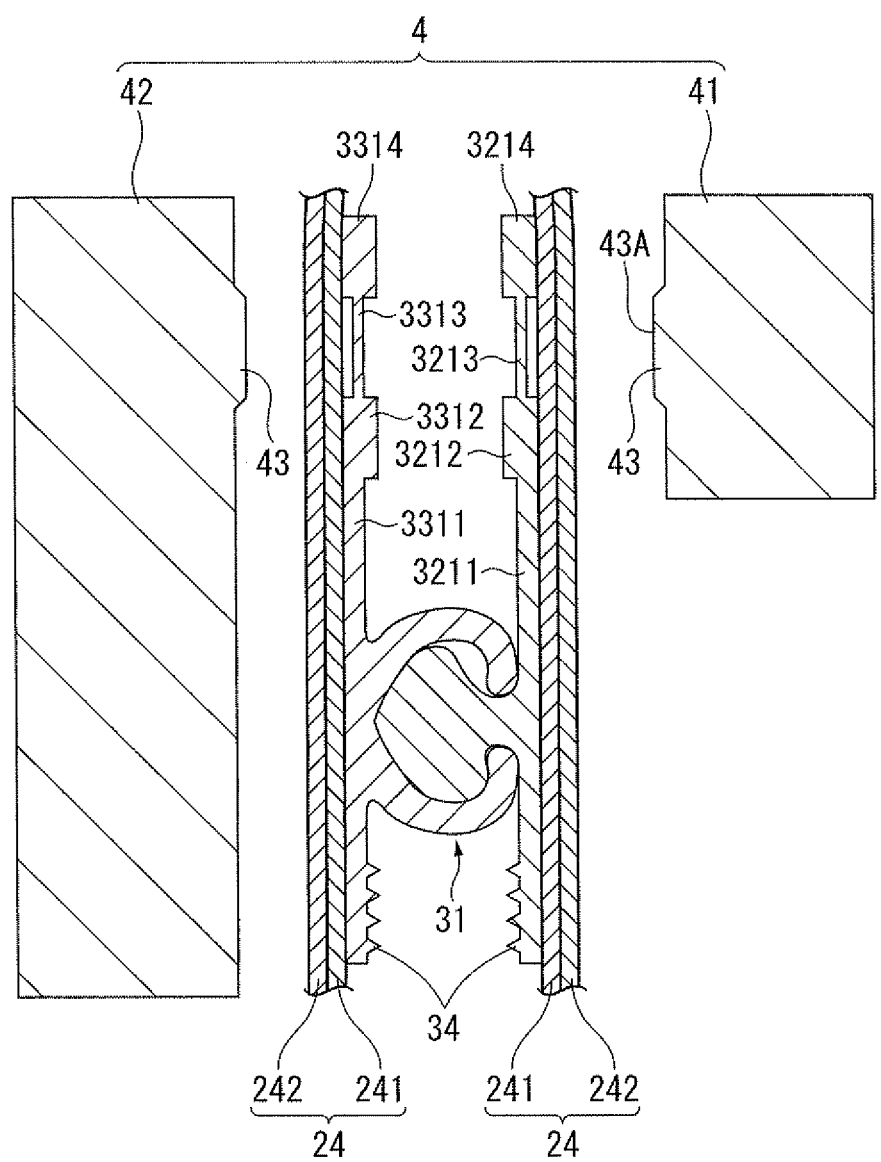
FIG. 10 is a cross section showing still another modification of the point seal process shown in FIG. 3.
Figure 11:
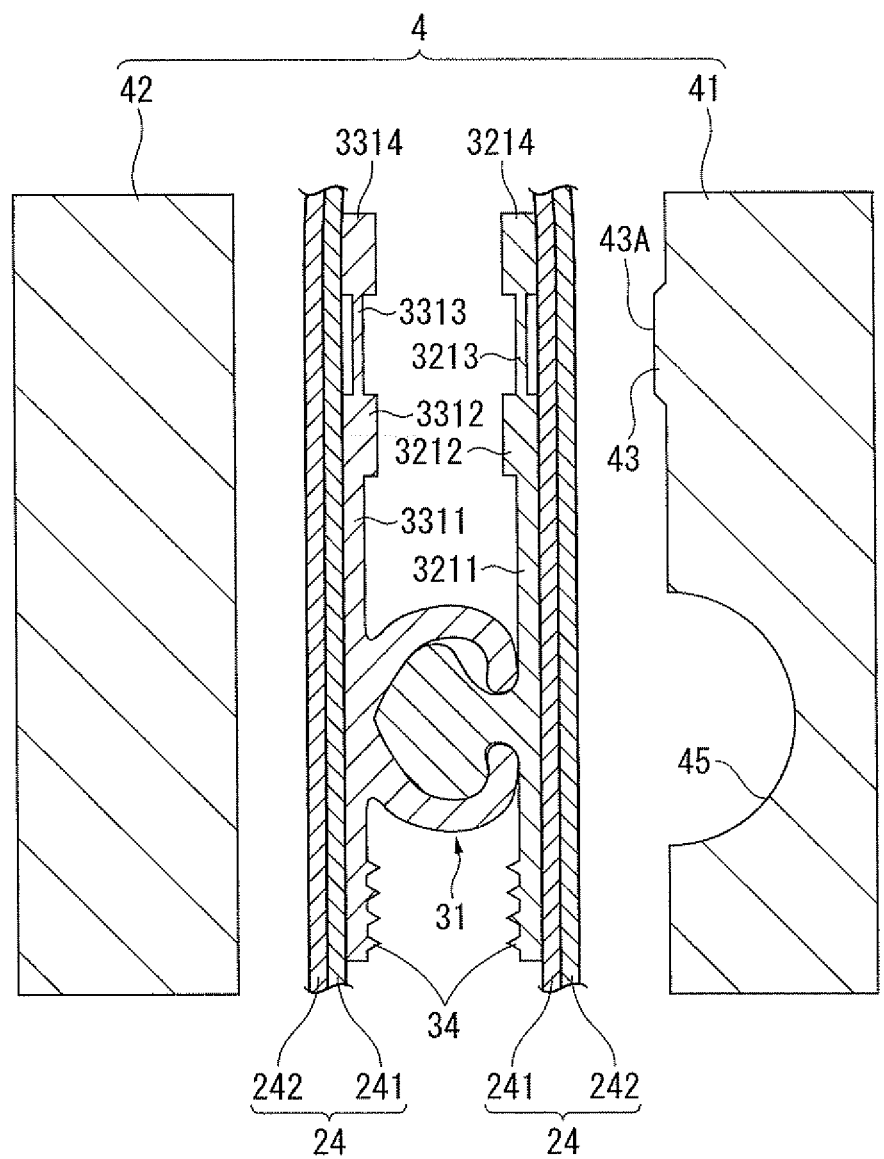
FIG. 11 is a cross section showing a further modification of the point seal process shown in FIG. 3.

Further alternatively, as shown in FIG. 10, convex portions 43 may be provided on the point seal bars 41 and 42 at positions opposing with each other. Still alternatively, a recessed portion 45 shaped along the cross section of the engagement portion 31 may be provided on the point seal bar 41 as shown in FIG. 11. With such an arrangement, since the bag-making process progresses along the engagement portion 31, the thin portion can be more stably and accurately melted and flattened. During the point seal process, a plurality of (e.g. two-stage, three-stage) sealing processes may be applied with point seal bars having differently sized contact surface on the convex portion. According to the above arrangement, the flattening process can be more stably conducted.

Though each of the thick first projecting portions 3212 and 3312 is respectively provided on the belt-shaped bases 321 and 331, two or more projecting portions may be provided. With such an arrangement, even when the cutting line is erroneously extended to the first projecting portion 3212 or 3312, the cutting line can be reliably returned to the peeling portion of the thin portions 3213 and 3313.

Further, though the package on which the zipper tape 3 is welded is a three-side seal bag in the above exemplary embodiments, the invention can be also applied to a bag obtained by the method disclosed in JP-A-2003-155044 or a pillow bag.

Though the belt-shaped bases 321 and 331 are provided by a single layer in the above exemplary embodiments, the belt-shaped bases may be provided by a plurality of layers. Especially, when a seal layer is provided on a side of the belt-shaped bases 321 and 331 to be welded to the bag body, a resin having excellent adhesiveness with the sealant layer 241 of the base material film 24 of the bag body 2 can be used for the seal layer. Accordingly, irrespective of the material used for the base material film 24 of the bag body 2, a zipper tape with excellent adhesiveness can be produced.

EXAMPLE

A zipper tape was prepared under different conditions as in the following examples and comparative examples. Subsequently, tearing resistance and the generation of cutting chips were examined.

Example 1

A zipper tape including a pair of male member and a female member as shown in FIG. 3 was obtained by co-extrusion. The used resin, the length of the thin portion and the thickness of the respective portions were as follows:
Zipper tape: Polypropylene (density 900 kg/m$^3$, MFR [Melt Flow Rate] 7.0 g/10 min)
Thin portion: Polypropylene (density 900 kg/m$^3$, MFR 7.0 g/10 min)
Length of thin portion (male member): 2 mm
Length of thin portion (female member): 5 mm
Thickness of first projecting portion and second projecting portion: 250 μm
Thickness of thin portion: 100 μm
Thickness of main body: 150 μm A film in which the zipper tape, a 15 μm thick biaxially oriented nylon film and a 50 μm thick linear low-density polyethylene film were dry-laminated was formed in a bag using a zipper-tape-attaching three-side bag-making machine to obtain a package bag provided with an easily tearable zipper-tape. Lastly, V-shaped cut portions were provided on the tape portion and thin portion of the zipper tape.

Example 2

In the same manner as the example 1 except for the length of the thin portion, the package bag provided with the easy-tearable zipper tape shown in FIGS. 1 and 2 was obtained. The resin and the length of the thin portion employed in the example 2 were as follows:
Zipper tape: Polypropylene (density 900 kg/m$^3$, MFR 7.0 g/10 min)
Thin portion: Polypropylene (density 900 kg/m$^3$, MFR 7.0 g/10 min)
Length of thin portion (male member): 5 mm
Length of thin portion (female member): 5 mm
Thickness of first projecting portion and second projecting portion: 250 μm
Thickness of thin portion: 100 μm
Thickness of main body: 150 μm Example 3

In the same manner as the example 2 except for the resin used for the zipper tape, a package bag provided with the easy-tearable zipper tape was obtained. The resin and the length of the thin portion employed in the example 3 were as follows:
Zipper tape: Low-density polyethylene (density 926 kg/m$^3$, MFR 1.5 g/10 min)
Thin portion: Polypropylene (density 900 kg/m$^3$, MFR 7.0 g/10 min)
Length of thin portion (male member): 5 mm
Length of thin portion (female member): 5 mm
Thickness of first projecting portion and second projecting portion: 250 μm
Thickness of thin portion: 100 μm
Thickness of main body: 150 μm Example 4

In the same manner as the example 2 except for the resin used for the zipper tape, a package bag provided with the easy-tearable zipper tape was obtained. The material and the length of the thin portion employed in the example 4 were as follows:
Zipper tape: Low-density polyethylene (density 926 kg/m$^3$, MFR 1.5 g/10 min)
Thin portion: Polypropylene (density 900 kg/m$^3$, MFR 7.0 g/10 min)
Length of thin portion (male member): 5 mm
Length of thin portion (female member): 5 mm
Thickness of first projecting portion and second projecting portion: 250 μm
Thickness of thin portion: 100 μm
Thickness of main body: 150 μm Example 5

A zipper tape having a thin portion and a second projecting portion only on a female member (third exemplary embodiment of the invention) was used to obtain a zipper tape by co-extrusion including a pair of a male member and a female member shown in FIG. 4. The used resin, the length of the thin portion and the thickness of the respective portions employed in the example 5 were as follows:
Zipper tape: Low-density polyethylene (density 926 kg/m$^3$, MFR 1.5 g/10 min)
Thin portion: Polypropylene (density 900 kg/m$^3$, MFR 7.0 g/10 min)
Length of thin portion (female member): 5 mm
Thickness of first projecting portion and second projecting portion: 250 μm
Thickness of thin portion: 100 μm
Thickness of main body: 150 μm A film in which the zipper tape, a 15 μm thick biaxially oriented nylon film and a 50 μm thick linear low-density polyethylene film were dry-laminated was formed in a bag using a zipper-tape-attaching three-side bag-making machine to obtain a package bag provided with an easily tearable zipper-tape. Lastly, V-shaped cut portions were provided on the tape portion and thin portion of the zipper tape.

Example 6

In the same manner as the example 1 except for the length of the thin portion, a package bag provided with the easy-tearable zipper tape was obtained. The resin and the length of the thin portion employed in the example 6 were as follows:
Zipper tape: Polypropylene (density 900 kg/m$^3$, MFR 7.0 g/10 min)

Thin portion: Polypropylene (density 900 kg/m$^3$, MFR 7.0 g/10 min)
 Length of thin portion (male member): 2 mm
 Length of thin portion (female member): 2 mm
 Thickness of first projecting portion and second projecting portion: 250 μm
  Thickness of thin portion: 100 μm
  Thickness of main body: 150 μm Comparative Example 1

A zipper tape provided with an easily-cuttable resin layer on a tape portion (see Example 1 of JP-A-2004-244027) and the above films were formed into a bag using a zipper-tape-attaching three-side bag-making machine to obtain a package bag provided with the zipper tape. Incidentally, after heat-sealing the side portion of the bag, notches are provided between the tape portion of the zipper tape and the easily-cuttable resin layer.

Comparative Example 2

A zipper tape provided with a cut tape on a belt-shaped base of a zipper tape (see FIG. 12 of JP-A-2004-276925) and the above films were formed into a bag using a zipper-tape-attaching three-side bag-making machine to obtain a package bag provided with the zipper tape. Incidentally, after heat-sealing the side portion of the bag, a notch is provided on both sides of an opening string.

Comparative Example 3

In the same manner as the example 1 except for the length of the thin portion, a package bag provided with the easy-tearable zipper tape was obtained. The resin and the length of the thin portion employed in the comparative example 3 were as follows:
 Zipper tape: Polypropylene (density 900 kg/m$^3$, MFR 7.0 g/10 min)
 Thin portion: Polypropylene (density 900 kg/m$^3$, MFR 7.0 g/10 min)
  Length of thin portion (male member): 0.4 mm
  Length of thin portion (female member): 0.4 mm
  Thickness of first projecting portion and second projecting portion: 250 μm
   Thickness of thin portion: 100 μm
   Thickness of main body: 150 μm Comparative Example 4

A zipper tape not provided with the first and the second projecting portions and having the same thickness as a main body except for a thin portion was produced, which was used to form a bag by a three-side bag-making machine to obtain a package bag provided with a zipper tape. The resin and the length of the thin portion employed in the comparative example 4 were as follows:
 Zipper tape: Polypropylene (density 900 kg/m$^3$, MFR 7.0 g/10 min)
 Thin portion: Polypropylene (density 900 kg/m$^3$, MFR 7.0 g/10 min)
  Length of thin portion (male member): 2 mm
  Length of thin portion (female member): 2 mm
  Thickness of thin portion: 100 μm
  Thickness of main body: 200 μm In the examples 1 to 5 and the comparative example 1, the bag was opened by tearing the front and back films from the notch provided on the side portion of the bag.

In the comparative example 2, a portion between the two notches provided on the end of the cut tape (thin portion) was pulled to cut the film of the bag body together with the cut tape (thin portion).

Evaluation of Level Differences at Cut Portion (Holdability)
 A: Level Difference produced (easy to pinch)
 B: Level Difference sometimes not produced (sometimes difficult to pinch)
Evaluation of Tearing Resistance
 A: Easily cut from notch
 B: Capable of being cut with small resistance from notch
 C: Felt resistance in cutting
Evaluation of Cutting Chip
 A: No cutting chip produced at cut portion
 B: Cutting chip produced at cut portion

TABLE 1

| | Level Difference at Cut Portion (Holdability) | Tearing Resistance | Cutting Chip | Overall Judgment |
|---|---|---|---|---|
| Example 1 | A | A | A | A |
| Example 2 | B | A | A | A |
| Example 3 | B | B | A | A |
| Example 4 | B | B | A | A |
| Example 5 | B | B | A | A |
| Example 6 | B | A | A | A |
| Comparative Example 1 | B | B | B | C |
| Comparative Example 2 | — | C | A | C |
| Comparative Example 3 | — | C | — | C |
| Comparative Example 4 | — | C | — | C |

The package bag according to the examples 1 and 6 could be easily cut without feeling tearing resistance. Further, no cutting chip was produced in opening the bag.

Though no excessive tearing resistance was felt in the comparative example 1, cutting chip was generated in opening the bag. The bag according to the comparative example 2 exhibited great tearing resistance, which could not be easily opened. No cutting chip was produced. The bag according to the comparative example 3 exhibited great tearing resistance on account of short thin portion, which could not be easily opened. The both sides of the thin portion of the comparative example 4 were thin, so that the both sides were cut simultaneously with tearing, which was not capable of linearly cut.

The invention claimed is:
1. An easily-tearable zipper tape that is attached to an inner surface of a package bag having an opening side, comprising: an engagement portion at which a male member and a female member are mated with each other; and belt-shaped bases provided continuously to the engagement portion of each of the male member and female member,
 at least one of the belt-shaped bases comprising:
 a main body on which the engagement portion is provided;
 a first projecting portion provided on the main body on a side adjacent to the opening side, the first projecting portion being thicker than the main body;
 a thin portion provided on the first projecting portion on a side adjacent to the opening side, and interposed between the first projecting portion and a second projecting portion, the thin portion being thinner than the first projecting portion and the main body; and the second projecting portion provided on the thin portion on a side adjacent to the opening side, the second projecting portion being thicker than the thin portion and the main body, wherein opposing surfaces of the first projecting portion and the second projecting portion respectively facing the inner surface of the bag body are substantially coplanarly positioned, and wherein the thin portion is recessed relative to the opposing surfaces to provide a level difference, the thin portion defining a tearing guide piece which is torn at a predetermined position when opening the bag.

2. The easily-tearable zipper tape according to claim 1, wherein
the belt-shaped bases of the male member and the female member respectively comprise the main body, the first projecting portion, the thin portion and the second projecting portion.

3. The easily-tearable zipper tape according to claim 2, wherein
lengths of the thin portion provided on the male member and the thin portion provided on the female member are different.

4. The easily-tearable zipper tape according to claim 1, wherein
one of the belt-shaped bases provided on the male member and the female member comprises the main body, the first projecting portion, the thin portion and the second projecting portion, and
the other of the belt-shaped bases comprises the main body and the first projecting portion.

5. The easily-tearable zipper tape according to claim 1, wherein
one or more ribs having the same height as a thickness of the first projecting portion and the second projecting portion are provided on the main body on a closed side relative to the engagement portion.

6. The easily-tearable zipper tape according to claim 1, wherein
the thickness of the thin portion is 0.12 mm or less, and
the thickness of the first projecting portion and the second projecting portion is 0.20 mm or more and 1 mm or less.

7. The easily-tearable zipper tape according to claim 1, wherein
the width of the thin portion is 0.5 mm or more and 5 mm or less.

8. The easily-tearable zipper tape according to claim 1, wherein
the first projecting portion, the second projecting portion and the thin portion are made of a polypropylene random copolymer.

9. The easily-tearable zipper tape according to claim 1, wherein
the first projecting portion and the second projecting portion are provided by the same kind of resin,
the thin portion is provided by a kind of resin different from the resin of the first projecting portion and the second projecting portion, and
the main body is provided by a kind of resin different from the resin of the first projecting portion and the second projecting portion.

10. The easily-tearable zipper tape according to claim 1, wherein
the first projecting portion, the second projecting portion and the thin portion are provided by the same kind of resin, and the main body is provided by a kind of resin different from the resin of the first projecting portion, the second projecting portion and the thin portion.

11. The easily-tearable zipper tape according to claim 1, wherein
the first projecting portion, the second projecting portion, the thin portion and the main body are respectively provided by different kinds of resins.

12. The easily-tearable zipper tape according to claim 1, wherein
a seal layer is provided on a surface of the first projecting portion, the second projecting portion and the main body to be attached to the inner surface of the bag body.

13. The easily-tearable zipper tape according to claim 12, wherein
the melting point of the resin forming the seal layer is lower than a melting point of the resin forming the first projecting portion, the second projecting portion and the main body, and comprises:
(A) 50 mass % or more and 100 mass % or less of metallocene-type linear low-density polyethylene having a density of 920 kg/m$^3$ or less and MFR of 5.0 g/10 min or less; and
(B) 0 mass % or more and 50 mass % or less of a composition consisting of propylene and α-olefin copolymer having 4 to 8 carbon atoms.

14. A method of producing the easily-tearable zipper tape according to claim 1, comprising:
co-extruding the main body provided with the engagement portion, the first projecting portion, the second projecting portion and the thin portion in a single step.

15. A package bag provided with an easily-tearable zipper tape, comprising: the easily-tearable zipper tape according to claim 1, and a bag body on which the easily-tearable zipper tape is attached, wherein
a space is defined by: an inner surface of the bag body; a surface of the thin portion facing the inner surface of the bag body; and surfaces of the first projecting portion and the second projecting portion intersecting the surface of the thin portion.

16. The package bag provided with an easily-tearable zipper tape according to claim 15, wherein
a side seal portion is provided in a direction intersecting the easily-tearable zipper tape, and
the thin portion is wider at the side seal portion than the thin portion located on an inner side of the side seal portion.

17. A producing device for producing the package bag provided with an easily-tearable zipper tape according to claim 16, comprising:
a pair of point seal bars that collapse the thin portion at the side seal portion,
at least one of the pair of point seal bars comprising a convex portion of which height is greater than a height of the space.

18. The producing device of the package bag provided with an easily-tearable zipper tape according to claim 17, wherein
the pair of point seal bars include a plurality of pairs of point seal bars respectively having differently sized contact surface on the convex portion.

19. A producing method for producing the package bag provided with an easily-tearable zipper tape using the producing device according to claim 18, wherein:
the pair of point seal bars include a plurality of pairs of point seal bars respectively having differently sized contact surface on the convex portion, and a sealing process is sequentially conducted starting from one of the pairs of point seal bars having the smallest contact surface on the convex portion.

20. A producing method for producing the package bag provided with an easily-tearable zipper tape using the producing device according to claim 17, comprising:

when the thin portion is collapsed, aligning the convex portion with a position of the thin portion; and melting and flattening the thin portion from a center of the thin portion toward an outside.

* * * * *